US012802842B2

(12) United States Patent
Nakayama et al.

(10) Patent No.: US 12,802,842 B2
(45) Date of Patent: Nov. 17, 2026

(54) COAXIAL CABLE

(71) Applicant: TOTOKU INC., Tokyo (JP)

(72) Inventors: Takeyasu Nakayama, Ueda (JP); Hiroto Imamura, Ueda (JP); Satoshi Yamazaki, Ueda (JP)

(73) Assignee: TOTOKU INC., Tokyo (JP)

( * ) Notice: Subject to any disclaimer, the term of this patent is extended or adjusted under 35 U.S.C. 154(b) by 129 days.

(21) Appl. No.: 18/580,798

(22) PCT Filed: Oct. 29, 2021

(86) PCT No.: PCT/JP2021/039939
§ 371 (c)(1),
(2) Date: Jan. 19, 2024

(87) PCT Pub. No.: WO2023/058250
PCT Pub. Date: Apr. 13, 2023

(65) Prior Publication Data

US 2025/0191811 A1 Jun. 12, 2025

(30) Foreign Application Priority Data

Oct. 6, 2021 (JP) ................................ 2021-164404

(51) Int. Cl.
*H01B 11/18* (2006.01)
*H01B 7/18* (2006.01)
*H01B 3/42* (2006.01)

(52) U.S. Cl.
CPC ......... *H01B 11/1821* (2013.01); *H01B 7/187* (2013.01); *H01B 11/183* (2013.01); *H01B 3/421* (2013.01)

(58) Field of Classification Search
CPC .... H01B 11/06; H01B 11/1821; H01B 11/183
See application file for complete search history.

(56) References Cited

U.S. PATENT DOCUMENTS 2,447,168 A * 8/1948 Dean .................. H01B 11/1025 156/55
4,847,448 A * 7/1989 Sato .................. H01B 11/1821 174/103
(Continued)

FOREIGN PATENT DOCUMENTS

JP 6-88015 U 12/1994
JP 7-20814 Y2 5/1995
(Continued)

OTHER PUBLICATIONS

International Search Report for PCT/JP2021/039939 dated Jan. 18, 2022.

*Primary Examiner* — Chau N Nguyen
(74) *Attorney, Agent, or Firm* — Sughrue Mion, PLLC

(57) ABSTRACT

To provide a coaxial cable having excellent shieldability and processability of an external conductor.
The above-described problem is solved by a coaxial cable comprising a center conductor (11), an insulator (12) provided on an outer periphery of the center conductor (11), an external conductor (13, 14) provided on an outer periphery of the insulator (12), and an outer coated body (15) covering the external conductor (13, 14). The external conductor (13, 14) is constituted by the lateral winding shield (13) provided with metal fine wires laterally wound on the outer periphery of the insulator (12), and the metal layer double-sided resin tape (14), with metal layers disposed on both sides, wound on the lateral winding shield (13).

2 Claims, 3 Drawing Sheets

(56) References Cited

U.S. PATENT DOCUMENTS

| | | | | |
|---|---|---|---|---|
| 6,201,190 | B1 * | 3/2001 | Pope .................. | H01B 11/1826<br>174/102 R |
| 11,037,703 | B2 * | 6/2021 | Visser ................ | H01B 11/1008 |
| 12,112,861 | B2 * | 10/2024 | Nakayama ......... | H01B 11/1821 |
| 2010/0288528 | A1 * | 11/2010 | Houston ............ | H01B 11/1895<br>174/102 R |
| 2011/0253416 | A1 * | 10/2011 | Amato ............... | H01B 11/1826<br>174/110 SR |
| 2015/0268276 | A1 | 9/2015 | Huang et al. | |

FOREIGN PATENT DOCUMENTS

| | | | |
|---|---|---|---|
| JP | 2001-126552 | A | 5/2001 |
| JP | 2007-188782 | A | 7/2007 |
| JP | 2015-185323 | A | 10/2015 |
| JP | 2019-129132 | A | 8/2019 |
| JP | 2020-024911 | A | 2/2020 |

* cited by examiner

COAXIAL CABLE

CROSS REFERENCE TO RELATED APPLICATIONS

This application is a National Stage of International Application No. PCT/JP2021/039939 filed Oct. 29, 2021, claiming priority based on Japanese Patent Application No. 2021-164404 filed Oct. 6, 2021.

FIELD OF THE INVENTION

The present invention relates to a coaxial cable and more specifically to a coaxial cable used in in-device antenna wiring and semiconductor devices compatible with the fifth generation communication standard (5G), and having excellent shieldability and processability of an external conductor.

BACKGROUND ART

Coaxial cables are utilized for transmission of high-frequency signals because of their excellent shieldability against noise and the like. In particular, coaxial cables used in in-device antenna wiring and semiconductor devices require a smaller diameter and favorable bending characteristics along with excellent shieldability. In response to such requirements, Patent Document 1, for example, proposes a coaxial cable that satisfies shieldability, flexibility, a smaller diameter configuration, bending resistance, and economic efficiency, and improves terminal processability. This coaxial cable has a structure in which a center conductor, an insulator, an external conductor having a lateral winding shield structure, and an outer coating are coaxially laminated sequentially.

In recent years, coaxial cables have been used to transmit high-frequency signals in electronic devices that are being increasingly miniaturized, such as personal computers, smartphones, and tablet terminals. In particular, coaxial cables used in in-device antenna wiring and semiconductor devices compatible with the fifth generation communication standard (5G) require a higher shielding effect due to leakage current being amplified by the in-device antennas.

PRIOR ART DOCUMENTS

Patent Documents

Patent Document 1: Japanese Laid-Open Patent Application Publication No. 2007-188782

SUMMARY OF THE INVENTION

Problems to be Solved by the Invention

In the process of studying coaxial cables to improve the shielding effect, the present inventors fabricated and studied the following types of external conductors: (1) an external conductor having a double structure provided with a fine wire lateral winding shield and polyethylene terephthalate (PET) tape provided with a copper layer having a thickness of 6 μm, for example, on one side, in this order; (2) an external conductor having a triple structure provided with a fine wire lateral winding shield, PET tape provided with a copper layer having a thickness of 6 μm, for example, on one side, and PET tape provided with a copper layer having a thickness of 6 μm, for example, on the other side, in this order; and (3) an external conductor having a double structure provided with a fine wire lateral winding shield and copper foil tape having a thickness of 15 μm, for example, in this order.

However, the coaxial cable including the external conductor of (1) described above did not have a sufficient shielding effect due to the copper layer having a thin thickness. Further, the coaxial cable including the external conductor of (2) described above was wound with two layers of PET tape, each provided with a copper layer having a thickness of 6 μm on one side, as the external conductor, resulting in the PET tape insulating the respective copper layers on the inner side and the outer side, and thus, to ensure that the total 12-μm copper layer functioned to improve shieldability, the copper layer positioned on the outer side had to be further grounded, making the processability complex. The coaxial cable including the external conductor of (3) described above had the drawback that the copper foil tape was hard, difficult to wind, and easy to break.

The present invention has been made to resolve the above-described problems, and an object thereof is to provide a coaxial cable used in in-device antenna wiring and semiconductor devices compatible with the fifth generation communication standard (5G), and having excellent shieldability and processability of an external conductor.

Means for Solving the Problems

A coaxial cable according to the present invention comprises a center conductor, an insulator provided on an outer periphery of the center conductor, an external conductor provided on an outer periphery of the insulator, and an outer coated body covering the external conductor. The external conductor is constituted by a lateral winding shield provided with metal fine wires laterally wound on the outer periphery of the insulator, and a metal layer double-sided resin tape, with metal layers disposed on both sides, wound on the lateral winding shield.

According to this invention, the coaxial cable includes the metal layer double-sided resin tape with metal layers disposed on both sides, and thus, with the metal layer double-sided resin tape being wound, the metal layers on both sides conduct electricity. This makes it possible to ensure a metal amount sufficient for enhancing shieldability, and does not require further grounding of the metal layer positioned on the outer side, as in the case of a resin tape including a metal layer on one side being wound in layers, resulting in excellent processability. Further, the metal layers are provided on both sides, making it possible to make a thickness of the layer on each side thinner, and thus avoid disconnection and winding difficulty such as with copper foil tape. Such a coaxial cable can constitute a coaxial cable having excellent shieldability and favorable processability, such as ground connection processing and tape windability, and is preferred for use in in-device antenna wiring and semiconductor devices compatible with the fifth generation communication standard (5G).

In the coaxial cable according to the present invention, preferably a thickness of each of the metal layers provided on both sides of the metal layer double-sided resin tape is 6 μm or more and 12 μm or less. According to this invention, the thickness of each metal layer is within the above-described range and thus, with the metal layer double-sided resin tape being wound, the conducting metal layers on both sides can ensure a metal amount sufficient for enhancing shieldability. Further, the metal layers are provided on both sides, making it possible to make a thickness of the layer on each side thinner, and thus avoid disconnection and winding difficulty such as with copper foil tape.

In the coaxial cable according to the present invention, preferably a thickness of the metal layer double-sided resin tape is 8 μm or more and 24 μm or less. According to this invention, the thickness of the metal layer double-sided resin tape is within the above-described range, making it possible to meet the demand for a smaller diameter of a coaxial cable.

In the coaxial cable according to the present invention, preferably a metal layer single-sided resin tape is provided by being laterally wound between the metal layer double-sided resin tape and the resin tape. According to this invention, it is possible to further increase a total quantity of the metal layers of the metal layer double-sided resin tape while keeping the thickness of each metal layer within a range that does not result in a reduction in flexibility, and further enhance the shieldability while maintaining productivity.

In the coaxial cable according to the present invention, preferably the outer coated body is constituted by a resin tape wound on the external conductor and an extruded sheath covering the resin tape.

In the coaxial cable according to the present invention, preferably an adhesive layer is provided on one surface of the resin tape and winding is performed so that the adhesive layer is on an inner side. According to this invention, the adhesive layer of the resin tape fixes the metal layer double-sided resin tape and the metal layer single-sided resin tape so that there is no position shift and thus, even if stress is applied during the wiring of the coaxial cable, a position shift does not occur in the lateral winding shield. As a result, it is possible to suppress a reduction in the shielding effect.

Effect of the Invention

According to the present invention, it is possible to provide a coaxial cable used in in-device antenna wiring and semiconductor devices compatible with the fifth generation communication standard (5G), and having excellent shieldability and processability of an external conductor. In particular, the coaxial cable includes the metal layer double-sided resin tape with the metal layers disposed on both sides and, with the metal layer double-sided resin tape being wound, the metal layers on both sides conduct electricity. This makes it possible to ensure a metal amount sufficient for enhancing shieldability, and does not require further grounding of the metal layer positioned on the outer side, as in the case of a resin tape including a metal layer on one side being wound in layers, resulting in excellent processability. Further, the metal layers are provided on both sides, making it possible to make a thickness of the layer on each side thinner, and thus avoid disconnection and winding difficulty such as with copper foil tape.

EMBODIMENTS OF THE INVENTION

Embodiments of a coaxial cable according to the present invention will now be described with reference to the drawings. It should be noted that the present invention includes aspects of the same technical concept as that of the forms set forth in the embodiments and the drawings described below, and the technical scope of the present invention is not limited only to the description of the embodiments and the description of the drawings.

[Coaxial Cable]

Figure 1:
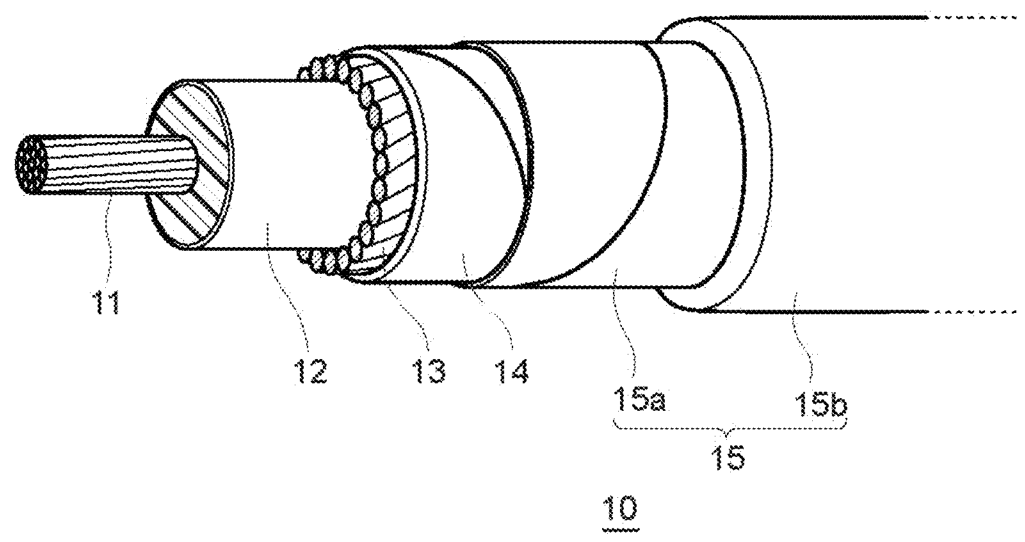
FIG. 1 is a perspective configuration view illustrating an example of a coaxial cable according to the present invention.

A coaxial cable 10 according to the present invention, as illustrated in FIG. 1, is a coaxial cable including a center conductor 11, an insulator 12 provided on an outer periphery of the center conductor 11, an external conductor (13, 14) provided on an outer periphery of the insulator 12, and an outer coated body 15 covering the external conductor (13, 14). Then, as a special characteristic thereof, the external conductor (13, 14) is constituted by the lateral winding shield 13 provided with metal fine wires laterally wound on the outer periphery of the insulator 12, and the metal layer double-sided resin tape 14, with metal layers 14*a*, 14*b* disposed on both sides, wound on the lateral winding shield 13.

This coaxial cable 10 includes the metal layer double-sided resin tape 14 with the metal layers 14*a*, 14*b* disposed on both sides and thus, with the metal layer double-sided resin tape 14 being wound, the metal layers 14*a*, 14*b* on both sides conduct electricity. This makes it possible to ensure a metal amount sufficient for enhancing shieldability, and does not require further grounding of the metal layer positioned on the outer side, as in the case of a resin tape including a metal layer on one side being wound in layers, resulting in excellent processability. Further, the metal layers 14*a*, 14*b* are provided on both sides, making it possible to make a thickness of the layer on each side thinner, and thus avoid disconnection and winding difficulty such as with copper foil tape.

In the following, each component will be described in detail.

The coaxial cable 10, as illustrated in FIG. 1, is constituted by the center conductor 11, the insulator 12 provided on the outer periphery of the center conductor 11, the external conductor (13, 14) provided on the outer periphery of the insulator 12, and the outer coated body 15 covering the external conductor (13, 14).

<Center Conductor>

The center conductor 11 is constituted by a single strand extending in a longitudinal direction of the coaxial cable 10, or is constituted by a plurality of strands twisted together. The type of strand is not particularly limited as long as composed of a metal having favorable conductivity, but preferable examples include a metal conductor having favorable conductivity, such as copper wire, copper alloy wire, aluminum wire, aluminum alloy wire, copper-aluminum composite wire, or any of these with a plating layer on a surface thereof. Copper wire and copper alloy wire are particularly preferred from the standpoint of high frequency use. As the plating layer, a solder plating layer, a tin plating layer, a gold plating layer, a silver plating layer, a nickel plating layer, or the like is preferred. A cross-sectional shape of the strand is also not particularly limited and, in the wire material thereof, may be circular or substantially circular or may be rectangular.

A cross-sectional shape of the center conductor 11 is also not particularly limited. The shape may be circular (including oval) or may be rectangular or the like, but is preferably circular. An outer diameter of the center conductor 11 is desirably as large as possible so that an electric resistance (alternating-current resistance, conductor resistance) is reduced and, to reduce a final outer diameter of the coaxial cable 10, examples thereof include an outer diameter within a range of about 0.09 to 1 mm. A surface of the center conductor 11 may be provided with an insulating film (not illustrated), as necessary. A type and a thickness of the insulating film are not particularly limited, but a film that breaks down well during soldering, for example, is preferred, and preferable examples thereof include a thermo-setting polyurethane film or the like.

<Insulator>

Figure 2A:
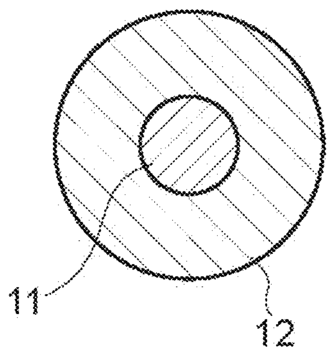
FIG. 2A is an example of a case in which an insulator has a solid structure.
Figure 2B:
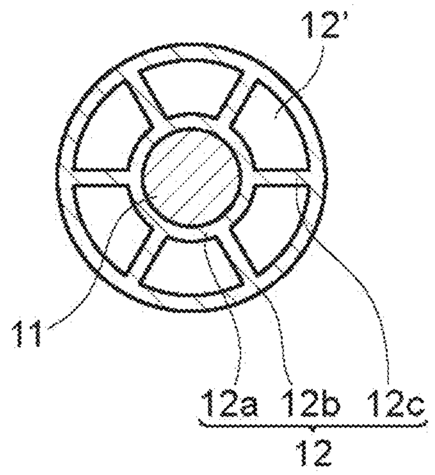
FIG. 2B is an example of a case in which the insulator has a hollow structure.

The insulator 12, as illustrated in FIG. 1 and FIGS. 2A and 2B, is an insulating layer having a low dielectric constant and continuously provided in the longitudinal direction on the outer periphery of the center conductor 11. A material of the insulator 12 is not particularly limited, and is selected as desired in correspondence with the required impedance characteristics, and a fluorine-based resin having a low dielectric constant of 2.0 to 2.5, such as, for example, perfluoroalkoxy alkane (PFA; ε2.1), ethylene tetrafluoro ethylene (ETFE; ε2.5), or fluorinated ethylene propylene (FEP; ε2.1) is preferred and, among these, PFA resin is preferred. It should be noted that the material of the insulator 12 may contain a coloring agent. A thickness of the insulator 12 is also not particularly limited, is selected as desired in correspondence with the required impedance characteristics and, for example, is preferably within a range of about 0.15 to 1.5 mm. A method of forming the insulator 12 is not particularly limited, but a solid structure, a hollow structure, or a foam structure can be easily formed by extrusion.

The insulator 12 may be a solid structure illustrated in FIG. 2A, may be a hollow structure illustrated in FIG. 2B, or may be a foam structure (not illustrated). It should be noted that the hollow structure includes a void part 12' in the structure interior, and the void part 12' may have, for example, a cross-sectional form surrounded by an inner annular part 12*a*, an outer annular part 12*b*, and a coupling part 12*c*, or the like. In the case of a hollow structure or a foam structure, there is an additional effect of reducing a material density of the insulator 12, making it possible to soften the insulator 12.

<External Conductor>

The external conductor (13, 14), as illustrated in FIG. 1, is provided on the outer periphery of the insulator 12. The external conductor (13, 14) is constituted by the lateral winding shield 13 provided with metal fine wires laterally wound on the outer periphery of the insulator 12, and the metal layer double-sided resin tape 14, with metal layers 14*a*, 14*b* disposed on both sides, wound on the lateral winding shield 13. The external conductor having such a double structure has a larger conductor cross-sectional area, making it possible to reduce insertion loss. Further, the lateral winding shield 13 is included, making it possible to realize a smaller diameter compared with a braided shield. In particular, in the present invention, the metal layer double-sided resin tape 14 with the metal layers 14*a*, 14*b* disposed on both sides is included, and thus, with the metal layer double-sided resin tape 14 being wound, the metal layers 14*a*, 14*b* on both sides conduct electricity, making it possible to ensure a metal amount sufficient for enhancing the shieldability. Furthermore, the metal layer double-sided resin tape 14 is provided on the lateral winding shield 13 in an electrically connected mode (fine wires and metal layers being in direct contact), making it possible to suppress a reduction in the shielding effect, even in a case in which gaps temporarily occur between the fine wires upon stress being applied to the lateral winding shield 13.

Figure 4:
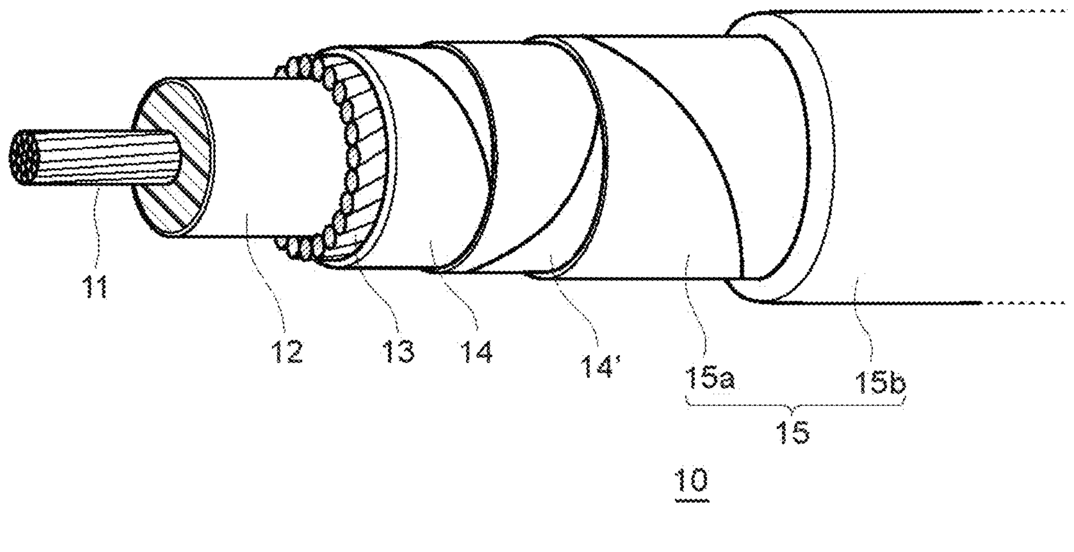
FIG. 4 is a perspective configuration view illustrating another example of a coaxial cable according to the present invention.

Further, as illustrated in FIG. 4, the external conductor may be an external conductor having a triple structure constituted by the lateral winding shield 13, the metal layer double-sided resin tape 14, and a metal layer single-sided resin tape 14'. An external conductor having a triple structure (13, 14, 14') can further increase the conductor cross-sectional area and further reduce insertion loss, similar to the external conductor having the double structure described above. The metal layer single-sided resin tape 14' used here is wound so that the metal layer included on one side is on the side of the metal layer double-sided resin tape 14, and thus the metal layer of the metal layer single-sided resin tape 14' and the metal layers of the metal layer double-sided resin tape 14 overlap and conduct electricity, making it possible to further ensure a metal amount sufficient for enhancing the shieldability.

(Lateral Winding Shield)

The lateral winding shield 13 is formed by laterally winding metal fine wires on the insulator 12, as illustrated in FIG. 1. The laterally wound metal fine wires may be in a single layer illustrated in FIG. 1 or may be in laminated layers (not illustrated) and, although not particularly limited, a single layer is preferred. Compared with a braided structure in which fine wires cross each other to form twists, the lateral winding of the metal fine wires allows a thickness of the lateral winding shield 13 to be thinned to the same extent that effects (sealing effect and the like) are obtained, which is advantageous from the standpoint of making the diameter of the coaxial cable 10 smaller.

The metal fine wire is not particularly limited as long as the wire has favorable conductivity and can be provided on the outer periphery of the insulator 12 as the lateral winding shield 13 that constitutes the coaxial cable 10. For example, various types of metal fine wires represented by tin-plated copper wires and the like can be preferably used. An outer diameter of the metal fine wire is not particularly limited and is determined in relation to an outer diameter of the insulator 12, but examples thereof include an outer diameter within a range of about 0.04 to 0.1 mm. The quantity of metal fine wires is also selected as desired depending on the outer diameter of the insulator 12, a planned outer diameter of the coaxial cable 10, and the like. A lateral winding pitch during the laterally winding of the metal fine wires is also not particularly limited, but is normally preferably about 0.5 to 11 mm.

(Metal Layer Double-Sided Resin Tape)

Figure 3:
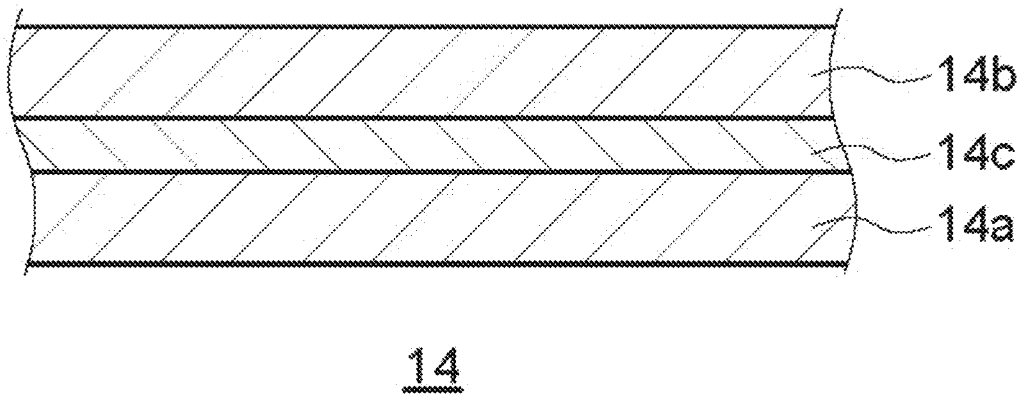
FIG. 3 is a sectional configuration view of a metal layer double-sided resin tape.

The metal layer double-sided resin tape 14 is provided by being laterally wound (spirally wound) on the lateral winding shield 13, as illustrated in FIG. 1. The metal layer double-sided resin tape 14, as illustrated in FIG. 3, is constituted by at least a resin base material 14*c*, and the metal layers 14*a*, 14*b* provided on outermost surfaces of both surfaces of the resin base material 14*c*. It should be noted that the terms "at least" and "outermost surface" mean that other layers may be provided between the resin base material and the metal layer, or on the other surface of the resin base material, as desired. For the metal layers, the side denoted by reference sign 14*a* may be the lateral winding shield 13 side, or the side denoted by reference sign 14*b* may be the lateral winding shield 13 side.

The metal layer double-sided resin tape 14 is wound on the lateral winding shield 13, and thus the metal layers 14*a*, 14*b* on both sides conduct electricity. This makes it possible to ensure a metal amount sufficient for enhancing shieldability, and does not require processing in which the metal layer positioned on the outer side is further grounded, as in the case of a resin tape including a metal layer on one side being wound in layers, resulting in excellent processability. Further, the metal layers 14*a*, 14*b* are provided on both sides, making it possible to make the thickness of the layer on each side thinner, and thus avoid disconnection and winding difficulty such as with copper foil tape. Such a metal layer double-sided resin tape 14 is provided, making it possible to realize the coaxial cable 10 having excellent shieldability and favorable processability, such as ground connection processing and tape windability.

The resin base material 14*c* is not particularly limited, but a polyester film such as polyethylene terephthalate and polyethylene naphthalate can be preferably used. A thickness of the resin base material 14*c* is selected as desired from those within a range of about 2 to 16 μm, for example, which are readily available.

Preferable examples of the metal layers 14*a*, 14*b* include a copper layer, an aluminum layer, or the like. Preferable examples of the metal layers 14*a*, 14*b* include a film formed on the resin base material 14*c* by vapor deposition or plating, metal foil bonded via an adhesive layer (for example, polyester-based thermoplastic adhesive resin, or the like) provided as necessary, or the like.

With the metal layer double-sided resin tape 14 being wound, the metal layers 14*a*, 14*b* on both sides conduct electricity, and thus thicknesses of the metal layers 14*a*, 14*b* are preferably thicknesses that can ensure a metal amount sufficient for making the shieldability favorable. The thickness of each of the metal layers 14*a*, 14*b* capable of ensuring the metal amount is preferably within a range of 6 μm or more and 12 μm or less. Within the thickness range described above, the metal layers 14*a*, 14*b* having the same thickness may be provided or the metal layers 14*a*, 14*b* having different thicknesses may be provided on both sides. When the thickness of each of the metal layers 14*a*, 14*b* is less than 6 μm, a total thickness is less than 12 μm and the metal amount is also insufficient, resulting in insufficient shieldability. When the thickness of each of the metal layers 14*a*, 14*b* exceeds 12 μm and the total thickness exceeds 24 μm, a rigidity of each metal layer increases, making winding difficult. With the standpoint of ease of winding taken into further consideration, the thickness of each of the metal layers 14*a*, 14*b* is more preferably within a range of 6 μm or more and 10 μm or less. It should be noted that, as the thickness of the metal layer increases, the rigidity increases and the ease of winding decreases, but this ease of winding depends on an outer diameter of the lateral winding shield 13 to be wound. In a case in which the thickness of each of the metal layers 14*a*, 14*b* is 12 μm, maximum, and the total thickness is 24 μm, maximum, as long as the outer diameter after the lateral winding shield 13 is wound is about 0.7 mm to about 2.1 mm as in the example described below, winding can be performed without reducing the ease of winding.

An overall thickness of the metal layer double-sided resin tape 14, which is a total thickness of the resin base material 14*c* and the metal layers 14*a*, 14*b*, is preferably, as a thickness that can contribute to making the diameter of the coaxial cable 10 smaller, within a range of about 14 to 26 μm.

The metal layer double-sided resin tape 14 is wound in layers within a range of ¼ wrap to ½ wrap. With the wrap set within this range, it is possible to ensure direct contact between the metal layers 14*a*, 14*b* constituting the metal layer double-sided resin tape 14 and the lateral winding shield 13, and realize a stable shielding effect. Furthermore, by being laterally wound on the basis of the above-described wrap, the metal layers of the metal layer double-sided resin tape 14 can be directly disposed on the metal fine wires without producing gaps between the metal layers. When the wrap is less than ¼, the overlap is small and thus a shift in position may occur during lateral winding, and when the wrap exceeds ½, an overlap thickness of the metal layer double-sided resin tape 14 increases, which may be disadvantageous in terms of achieving a smaller diameter. It should be noted that a winding pitch of the metal layer double-sided resin tape 14 is set as desired by a width and the wrap of the metal layer double-sided resin tape 14 and thus is not particularly limited, but in a case in which the width of the metal layer double-sided resin tape 14 is within a range of about 3 to 6 mm, for example, the winding pitch is preferably within a range of 1.5 to 10 mm, for example. A lateral winding direction of the metal layer double-sided resin tape 14 may be the same as a lateral winding direction of the metal fine wires described above or may be a winding direction opposite thereto, but the direction opposite thereto is preferred.

It should be noted that, with the metal layer double-sided resin tape 14 provided with the metal layers 14*a*, 14*b* on both sides, even in a case in which a gap temporarily occurs in the lateral winding shield 13, the fine wires of the lateral winding shield 13 and the metal layer of the metal layer double-sided resin tape 14 come into direct contact, making it possible to suppress a reduction in the shielding effect.

(Metal Layer Single-Sided Resin Tape)

The metal layer single-sided resin tape 14' may be further provided by being laterally wound (spirally wound) on the metal layer double-sided resin tape 14, as illustrated in FIG. 4. The metal layer single-sided resin tape 14' is constituted by at least a resin base material and a metal layer provided on an outermost surface of one surface of the resin base material (not illustrated). It should be noted that the terms “at least” and “outermost surface” mean that other layers may be provided between the resin base material and the metal layer, or on the other surface of the resin base material, as desired. This metal layer single-sided resin tape 14' is laterally wound with the metal layer provided on one side placed on the side of the metal layer double-sided resin tape 14.

The resin base material and the metal layer constituting the metal layer single-sided resin tape 14' are preferably constituted by the same materials and within thickness ranges as those of the resin base material and metal layers constituting the metal layer double-sided resin tape 14 described above. Here, the descriptions thereof will be omitted. The thickness of the metal layer is not particularly limited, but from the standpoint of being able to further ensure the metal amount of the external conductor as a whole, is preferably within a range of 3 μm or more and 12 μm or less, and is more preferably within a range of 3 μm or more and 6 μm or less. It should be noted that a total thickness of the metal layer single-sided resin tape 14' differs depending on a thickness of the resin base material as well, but is preferably within a range of 5 μm or more and 18 μm or less. Such an external conductor having a triple structure including the metal layer single-sided resin tape 14' can further increase the total of the metal amount and enhance shieldability.

Further, when the thickness of each of the metal layers (14*a*, 14*b*) of the metal layer double-sided resin tape 14 described above is set to a thickness exceeding 12 μm, for example, to increase the metal amount, the rigidity of each metal layer increases and flexibility decreases, making winding difficult and reducing productivity. To solve this problem, the metal layer single-sided resin tape 14' is provided on the metal layer double-sided resin tape 14, making it possible to further increase the total quantity of the metal layers while keeping the thickness of each metal layer (14*a*, 14*b*) of the metal layer double-sided resin tape 14 described above within the range (6 to 12 μm) previously described that does not result in a reduction in flexibility, and further enhance the shieldability while maintaining productivity. With the metal layer single-sided resin tape 14' being provided on the metal layer double-sided resin tape 14, the overall total thickness of the metal layers of each tape is increased, making it possible to further enhance the shieldability while maintaining ease of winding. The overall total thickness is preferably 15 μm or greater than the sum of the lower limit values of the respective metal layers.

It should be noted that the metal layer single-sided resin tape 14' is preferably wound in layers within the same wrap range as that of the metal layer double-sided resin tape 14 described above, and exhibits the same effects as described above. A lateral winding direction of the metal layer single-sided resin tape 14' may be the same winding direction as the lateral winding direction of the metal layer double-sided resin tape 14 or may be a winding direction opposite thereto, but the direction opposite thereto is preferred.

<Outer Coated Body>

The outer coated body 15, as illustrated in FIG. 1, is provided on an outer periphery of the external conductor (13, 14) and is specifically provided on the external conductor (on the metal layer double-sided resin tape 14 in FIG. 1, and on the metal layer single-sided resin tape 14' in FIG. 4). The outer coated body 15 is not particularly limited, but examples include an outer coated body constituted by a resin tape 15*a* wound on the metal layer double-sided resin tape 14 illustrated in FIG. 1 or the metal layer single-sided resin tape 14' illustrated in FIG. 4, and an extruded sheath 15*b* covering the resin tape 15*a*. Materials of the resin tape 15*a* and the extruded sheath 15*b* are not particularly limited as long as the materials have insulating properties. The resin tape 15*a* can be exemplified by a resin tape including an adhesive layer on one side thereof and can be provided by being spirally wound on the metal layer double-sided resin tape 14 or the metal layer single-sided resin tape 14'. The extruded sheath 15*b* can be exemplified by an insulating sheath provided by extruding a resin.

(Resin Tape)

The resin tape 15*a* is provided by being laterally wound (spirally wound) on the metal layer double-sided resin tape 14 illustrated in FIG. 1 or the metal layer single-sided resin tape 14' illustrated in FIG. 4. The resin tape 15*a* need not include an adhesive layer, but preferably includes an adhesive layer. The resin tape 15*a* including an adhesive layer includes a resin base material and an adhesive layer provided on an outermost surface of one surface of the resin base material. Such a resin tape 15*a* is provided by being laterally wound with the side of the adhesive layer placed on the side of the metal layer double-sided resin tape 14 or the metal layer single-sided resin tape 14'. This way, the resin tape 15*a* and the metal layer double-sided resin tape 14 or the metal layer single-sided resin tape 14' are adhered and fixed, and thus the metal layer double-sided resin tape 14 or the metal layer single-sided resin tape 14' does not shift in position even in a case in which stress is applied during wiring, making it possible to suppress a reduction in shieldability. It should be noted that the term "outermost surface" means that other layers may be provided between the resin base material and the adhesive layer or on the other surface of the resin base material, as desired. Further, the other surface is not provided with an adhesive layer and thus is not adhered to the extruded sheath 15*b* formed thereon, and the advantage is also that, in a case in which stress is applied during wiring, for example, slippage occurs at an interface between the resin tape 15*a* and the extruded sheath 15*b*, making bending flexible.

The resin tape 15*a*, similar to the above-described metal layer double-sided resin tape 14 or the metal layer single-sided resin tape 14', is wound in layers within a range of ¼ wrap to ½ wrap. With the wrap set within this range, the adhesive layer constituting the resin tape 15*a* can fix the resin tape 15*a* itself, and adhere to the metal layer double-sided resin tape 14 or the metal layer single-sided resin tape 14' to fix the metal layer double-sided resin tape 14 or the metal layer single-sided resin tape 14'. When the wrap is less than ¼, the overlap is small and thus a shift in position may occur during lateral winding, and when the wrap exceeds ½, an overlap thickness of the resin tape 15*a* increases, which may be disadvantageous in terms of achieving a smaller diameter. It should be noted that a winding pitch of the resin tape 15*a* is set as desired by a width and the wrap of the resin tape 15*a*, but in a case in which the width of the resin tape 15*a* is within a range of about 3 to 6 mm, for example, the winding pitch is preferably within a range of 1.5 to 10 mm, for example. A lateral winding direction of the resin tape 15*a* may be the same winding direction as the lateral winding direction of the metal layer double-sided resin tape 14 or the metal layer single-sided resin tape 14' described above or may be a winding direction opposite thereto, but the winding direction opposite thereto is preferred.

The resin base material constituting the resin tape 15*a* is not particularly limited, and examples include polyethylene terephthalate (PET), polyethylene naphthalate (PEN), polyamide (PA), polyimide (PI), polyphenylene sulfide (PPS), ethylene-tetrafluoroethylene copolymer (ETFE), tetrafluoroethylene-hexafluoropropylene copolymer (FEP), fluorinated resin copolymer (perfluoroalkoxy fluororesin: PFA), polyether ether ketone (PEEK), and the like. In particular, a polyester film such as polyethylene terephthalate and polyethylene naphthalate can be preferably used. A thickness of the resin base material is selected as desired from those within a range of about 2 to 6 mm, for example.

The adhesive layer desirably constituting the resin tape 15*a* is provided on one side of the resin base material, and examples of a material thereof include a urethane adhesive, an epoxy adhesive, an acrylic adhesive, and the like. A thickness of the adhesive layer is also not particularly limited, but may be about 1 to 3 μm.

For this resin tape 15*a*, given T2 as a thickness of the resin tape 15*a* and T1 as the thickness of the metal layer double-sided resin tape 14 or the metal layer single-sided resin tape 14', T2/T1 is preferably within a range of ⅙ (=0.167) or more and ⅘ (=0.8) or less, and T2/T1 is more preferably within a range of ¼ (=0.25) or more and ⅗ (=0.600) or less. This way, it is possible to reduce a size of a step (approximately 7 μm or less) that occurs due to the thickness of the resin tape 15*a* compared with a case in which the metal layer double-sided resin tape 14 or the metal layer single-sided resin tape 14' is used alone. Therefore, appearance irregularities caused by air existing in these steps can be suppressed. As a result, it is possible to suppress changes in outer diameter in the longitudinal direction and process terminals under the same conditions when connecting the terminals to connectors.

It should be noted that the present air expands with heat during subsequent extrusion molding of the extruded sheath 15*b*, resulting in a problem of the occurrence of unevenness and deterioration in appearance. Therefore, extrusion molding is performed while suctioning with a vacuum pump so that as little air as possible remains, but this has not been a sufficient solution. Such appearance irregularities change the outer diameter of the coaxial cable in a longitudinal direction and, when the terminals are connected to connectors under the same terminal processing conditions, the processing yield deteriorates, and thus the terminal processing conditions must be changed each time. In response to such problems, in the coaxial cable 10 obtained with T2/T1 set within the above-described range, appearance irregularities are suppressed, making it possible to suppress changes in outer diameter in the longitudinal direction and process the terminals under the same conditions when connecting the terminals to the connectors. Further, it is possible to realize a smaller diameter compared with a case of a braided shield alone and, even in a case in which gaps temporarily occur in the lateral winding shield, suppress a reduction in the shielding effect. As a result, it is possible to realize a smaller diameter that enables in-device wiring in a narrow space, which is particularly preferred for use in in-device antenna wiring and semiconductor devices compatible with the fifth generation communication standard (5G).

In a case in which T2/T1 is preferably greater than ⅘, more preferably greater than ⅗, a step occurs in the resin tape 15*a* as well, and thus a sufficient improvement effect may not be obtained. In a case in which T2/T1 is preferably less than ⅙, more preferably less than ¼, the resin tape 15*a* is too thin, and an extent of the step in the metal layer double-sided resin tape 14 or the metal layer single-sided resin tape 14' may remain as is, and thus a sufficient improvement effect may not be obtained. A size of the step that affects the appearance differs depending on the overall outer diameter as well, but in a case in which a step of 10 μm or greater occurs, for example, the appearance becomes noticeably uneven, and thus a step of less than 10 μm is preferably the limit. It should be noted that the thickness T2 of the resin tape 15*a* preferably satisfies the relationship "T2/T1=⅙ to ⅘," more preferably satisfies the relationship "T2/T1=¼ to ¾," and preferably is specifically a thickness of 4 μm or more and less than 10 μm, more specifically 4 μm or more and 9 μm or less.

(Extruded Sheath)

The extruded sheath 15*b* is provided by extrusion molding on the resin tape 15*a*. As the constituent resin of the extruded sheath 15*b*, various resins applied to resin extrusion for outer coated bodies can be used. For example, the resin may be a fluorine-based resin such as PFA, ETFE, or FEP, may be a vinyl chloride resin, may be a polyolefin resin such as polyethylene, or may be a polyester resin such as polyethylene terephthalate. In the coaxial cable 10 according to the present invention, a fluororesin is preferred.

In a case in which the extruded sheath 15*b* is provided, preferably extrusion molding is performed while suctioning with a vacuum pump so that as little air as possible remains between the extruded sheath 15*b* and the resin tape 15*a*. A total thickness of the outer coated body 15 constituted by this extruded sheath 15*b* and the above-described resin tape 15*a* may be within a range of about 0.1 to 1.0 mm, for example.

The final outer diameter of the coaxial cable 10 obtained is preferably within a range of about 0.6 to 3.5 mm.

EXAMPLES

In the following, the present invention will be more specifically described through examples. It should be noted that the present invention is not limited to the examples below.

Example 1

First, the coaxial cable 10 having a form illustrated in FIG. 1 was fabricated. A silver-plated soft copper wire having an outer diameter of 0.203 mm was used as the center conductor 11. Next, PFA resin (manufactured by DuPont, dielectric constant 2.1) having a thickness of 0.210 mm was extruded to form the solid structure illustrated in FIG. 2A on the outer periphery of the center conductor 11, and the outer diameter was 0.623 mm. Next, the lateral winding shield 13 and the metal layer double-sided resin tape 14 were provided as the external conductor. The lateral winding shield 13 was formed as a single layer on the insulator 12. Specifically, the lateral winding shield 13 was formed by using and counterclockwisely winding 38 silver-plated soft copper wires having an outer diameter of 0.050 mm at a 6.5-mm pitch. The outer diameter after formation was 0.723 mm. Next, the metal layer double-sided resin tape 14 was wound on the lateral winding shield 13. The metal layer double-sided resin tape 14 used was a tape having a total thickness of 14.5 μm and a width of 3 mm and provided with a copper foil having a thickness of 6 μm on both surfaces of a PET base material having a thickness of 2.5 μm. This metal layer double-sided resin tape 14 was wound in the direction opposite to the winding direction of the lateral winding shield 13 by ⅓ wrap (overlapping by a width of 1 mm only) on the lateral winding shield 13.

Next, the resin tape 15*a* having a total thickness of 4 μm and a width of 3 mm and provided with an adhesive layer having a thickness of 1 μm on one side thereof, was wound on the metal layer double-sided resin tape 14, with the adhesive layer side being on the inner side (side of the metal layer double-sided resin tape 14). The winding form was ⅓ wrap (overlapping by a width of 1 mm only), and the resin tape 15*a* was wound in the direction opposite to the winding direction of the metal layer double-sided resin tape 14. Heating was performed during the winding process, and the adhesive layer and the metal layer double-sided resin tape 14 were adhered. Subsequently, as the extruded sheath 15*b*, a PFA resin (manufactured by DuPont) layer was extruded and formed to a thickness of 50 μm while suctioning with a vacuum pump, and the coaxial cable 10 having an outer diameter of 0.879 mm was fabricated. In this coaxial cable 10, the thickness T2 of the resin tape 15*a* and the thickness T1 of the metal layer double-sided resin tape 14 had a relationship such that T2/T1 was 4/14.5=0.276.

Example 2

In Example 1, as the metal layer double-sided resin tape 14, a tape having a total thickness of 22.5 μm and a width of 3 mm and provided with a copper foil having a thickness of 10 μm on both surfaces of a PET base material having a thickness of 2.5 μm, was used. With all other conditions being the same as in Example 1, the coaxial cable 10 having an outer diameter of 0.903 mm was fabricated. In this coaxial cable 10, the thickness T2 of the resin tape 15*a* and the thickness T1 of the metal layer double-sided resin tape 14 had a relationship such that T2/T1 was 4/22.5=0.178.

Example 3

In Example 1, as the resin tape 15*a*, the resin tape 15*a* having a total thickness of 8 μm and a width of 3 mm and provided with an adhesive layer having a thickness of 1 μm on one side thereof, was used. With all other conditions being the same as in Example 1, the coaxial cable 10 having an outer diameter of 0.891 mm was fabricated. In this coaxial cable 10, the thickness T2 of the resin tape 15*a* and the thickness T1 of the metal layer double-sided resin tape 14 had a relationship such that T2/T1 was 8/14.5=0.552.

Example 4

In Example 1, as the metal layer double-sided resin tape 14, a tape having a total thickness of 18.5 μm and a width of 3 mm and provided with a copper foil having a thickness of 6 μm on one surface and a copper foil having a thickness of 10 μm on the other surface of a PET base material having a thickness of 2.5 μm, was used. This metal layer double-sided resin tape 14 was wound in the direction opposite to the winding direction of the lateral winding shield 13 by the same wrap as in Example 1 so that the metal layer having a thickness of 6 μm was on the side of the lateral winding shield 13. With all other conditions being the same as in Example 1, the coaxial cable 10 having an outer diameter of 0.903 mm was fabricated.

Example 5

In Example 1, the metal layer single-sided resin tape 14' was provided by being laterally wound between the metal layer double-sided resin tape 14 and the resin tape 15*a*. The metal layer single-sided resin tape 14' used was a tape having a total thickness of 16 μm and a width of 3 mm and provided with a copper foil having a thickness of 12 μm on one surface of a PET base material having a thickness of 4 μm. This metal layer single-sided resin tape 14' was wound in the direction opposite to the winding direction of the metal layer double-sided resin tape 14 by ⅓ wrap (overlapping by a width of 1 mm only) on the metal layer double-sided resin tape 14 so that the metal layer was on the metal layer double-sided resin tape 14 side. On the metal layer single-sided resin tape 14', the resin tape 15*a* was wound in a direction opposite to the winding direction of the metal layer single-sided resin tape 14'. As the resin tape 15*a*, a tape having a total thickness of 9 μm and a width of 3 mm and provided with an adhesive layer having a thickness of 1 μm on one side thereof, was used. With all other conditions being the same as in Example 1, the coaxial cable 10 having an outer diameter of 0.903 mm was fabricated.

Reference Example 1

In Example 1, instead of the metal layer double-sided resin tape 14, a metal layer single-sided resin tape having a total thickness of 10.5 μm and a width of 3 mm and provided with a copper foil having a thickness of 8 μm on one surface of a PET base material having a thickness of 2.5 μm, was used and wound so that the copper foil was on the lateral winding shield 13 side. With all other conditions being the same as in Example 1, the coaxial cable 10 having an outer diameter of 0.867 mm was fabricated.

Reference Example 2

In Example 1, instead of the metal layer double-sided resin tape 14, a metal layer single-sided resin tape having a total thickness of 13 μm and a width of 3 mm and provided with a copper foil having a thickness of 10.5 μm on the one surface of a PET base material having a thickness of 2.5 μm, was used and wound so that the copper foil was on the lateral winding shield 13 side. Subsequently, the same metal layer single-sided resin tape as described above was wound on the metal layer single-sided resin tape already wound in a direction opposite to that winding direction, with an orientation of the metal layer being the same. With all other conditions being the same as in Example 1, the coaxial cable 10 having an outer diameter of 0.874 mm was fabricated.

Reference Example 3

In Example 1, instead of the metal layer double-sided resin tape 14, a copper foil tape having a thickness of 15 μm and a width of 3 mm was used and wound on the lateral winding shield 13. With all other conditions being the same as in Example 1, the coaxial cable 10 having an outer diameter of 0.904 mm was fabricated.

Evaluation

Shieldability was evaluated by shielding effect measurements based on a measurement method in accordance with MIL-C-85485A. As for the quality determination by that measurement method, shieldability was identified as favorable in a case in which the evaluation result was 70 dB or higher, and as insufficient in a case in which the evaluation result was less than 70 dB. The results for the coaxial cables in Examples 1 to 5 were 72.4, 77.2, 73.8, 76.5, and 75.4, respectively, indicating favorable shieldability. On the other hand, the results for the coaxial cables in Reference Examples 1 to 3 were 62.2, 60.5, and 68.5, respectively, indicating insufficient shieldability.

The reason that the evaluation results of Examples 1 to 5 were favorable is that, with the metal layer double-sided resin tape 14 or the metal layer double-sided resin tape 14 and the metal layer single-sided resin tape 14' being wound, the metal layers 14*a*, 14*b* on both sides conduct electricity, making it possible to ensure a metal amount (total thickness within the range of 12 to 24 μm) sufficient for enhancing the shieldability. In Example 5, the metal layer single-sided resin tape 14' provided with the copper foil having a thickness of 12 μm was further wound while keeping the thickness of each metal layer (14*a*, 14*b*) of the metal layer double-sided resin tape 14 within a thickness range (6 to 12 μm) that did not result in a reduction in flexibility, making it possible to further increase the total quantity of the metal layers without a loss in the flexibility required for tape winding and further enhance the shieldability while maintaining productivity. The reason that the evaluation result of Reference Example 1 was insufficient is that, although the metal layer single-sided resin tape was wound, the thickness of one side was only 8 μm, which could not ensure a metal amount sufficient for enhancing shieldability. The reason that the evaluation result of Reference Example 2 was insufficient is that, although the metal layer single-sided resin tape was wound in two layers, the metal layer constituting each of the metal layer single-sided resin tapes did not conduct electricity, and thus the thickness of one side was only 10.5 μm, which could not ensure a metal amount sufficient for enhancing shieldability. It should be noted that, in Reference Example 3, a copper foil tape having a thickness of 15 μm was used, which exhibited favorable shieldability, but the thickness exceeded 12 μm, making tape windability unfavorable and cracking and disconnection easy to occur.

Processability was evaluated by the ease of the processing of grounding from the external conductor. In the coaxial cables of Examples 1 to 5, a metal layer double-sided resin tape 14 with the metal layers 14*a*, 14*b* on both sides conducting electricity was laterally wound on the lateral winding shield 13, and thus the lateral winding shield 13 and the metal layers 14*a*, 14*b* conducted electricity. Therefore, it was not necessary to further ground the metal layer positioned on the outer side, as in the case in Reference Example 2 in which the resin tape including the metal layer on one side was wound in layers, and thus grounding needed only to be performed once, making the processing easy. On the other hand, in the coaxial cable in Reference Example 2, the resin tape including the metal layer on one side was wound in layers, further requiring the grounding of the metal layer positioned on the outer side, making the processing difficult. It should be noted that, in Reference Example 1, the metal layer single-sided resin tape was laterally wound on the lateral winding shield 13 and, in Reference Example 3, the copper foil tape was laterally wound on the lateral winding shield 13, and thus grounding needed only to be performed once in both cases, making the processing easy.

The steps and the appearances were visually evaluated. The steps were all less than 10 μm in Examples 1 to 5. The final appearance of the coaxial cable after being provided with the extruded sheath 15*b* fluctuated slightly in Examples 1 to 5, but the terminals could also be processed under the same conditions. In this way, it was visually confirmed that, with the step made smaller, an air layer was reduced, the appearance was improved, and waviness (outer diameter fluctuation) in the longitudinal direction was reduced.

DESCRIPTIONS OF REFERENCE NUMERALS

10 Coaxial cable
11 Center conductor
12 Insulator
12*a* Inner annular part
12*b* Outer annular part
12*c* Coupling part
12' Void part
13 Lateral winding shield
14 Metal layer double-sided resin tape
14' Metal layer single-sided resin tape
14*a*, 14*b* Metal layer
14*c* Resin base material
15 Outer coated body
15*a* Resin tape
15*b* Extruded sheath

What is claimed is:

1. A coaxial cable comprising:

a center conductor;

an insulator provided on an outer periphery of the center conductor;

an external conductor provided on an outer periphery of the insulator;

an outer coated body covering the external conductor, the external conductor being constituted by a lateral winding shield provided with metal fine wires laterally wound on the outer periphery of the insulator, and a metal layer double-sided resin tape consisting of metal layers disposed on both sides of a resin base material, wound on the lateral winding shield; and a metal layer single-sided resin tape laterally wound on the metal layer double-sided resin tape and provided between the metal layer double-sided tape and the outer coated body, wherein a lateral winding direction of the metal layer single-sided resin tape is an opposite winding direction with respect to a lateral winding direction of the metal layer double-sided resin tape;

wherein a thickness of each metal layer of the metal layer double-sided resin tape is 6 μm or more and 12 μm or less; and the outer coated body is constituted by a resin tape wound on the external conductor and an extruded sheath covering the resin tape.

2. The coaxial cable according to claim 1, wherein an adhesive layer is provided on one surface of the resin tape and winding is performed so that the adhesive layer is on an inner side.

* * * * *